US010962047B1

(12) United States Patent
Connell et al.

(10) Patent No.: US 10,962,047 B1
(45) Date of Patent: Mar. 30, 2021

(54) ADJUSTABLE TIE ROD ASSEMBLIES HAVING A SWIVEL END AND RELATED METHODS

(71) Applicant: The Boeing Company, Chicago, IL (US)

(72) Inventors: John Aaron Connell, Kent, WA (US); Mikhail V. Timchenko, Moscow (RU); Evgeny N. Golov, Moscow (RU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/093,208

(22) Filed: Nov. 9, 2020

(30) Foreign Application Priority Data

Jan. 28, 2020 (RU) .......................... RU2020103575

(51) Int. Cl.
*F16C 7/06* (2006.01)
*F16C 7/02* (2006.01)

(52) U.S. Cl.
CPC . *F16C 7/02* (2013.01); *F16C 7/06* (2013.01)

(58) Field of Classification Search
CPC .. F16C 7/02; F16C 7/023; F16C 7/026; F16C 7/06; F16C 7/08
See application file for complete search history.

(56) References Cited

U.S. PATENT DOCUMENTS

| | | |
|---|---|---|
| 2,906,311 A | 9/1959 | Boyd |
| 3,180,390 A | 4/1965 | Ockert, Jr. |
| 4,016,914 A | 4/1977 | Zurko |
| 4,016,941 A | 4/1977 | Sanders |
| 4,097,163 A | 6/1978 | Dubuque |
| 4,681,495 A | 7/1987 | Crespin et al. |
| 6,595,714 B2 | 7/2003 | Moore |
| 7,207,854 B1 * | 4/2007 | Anderson, Jr. ........ B63H 5/125 440/53 |

(Continued)

FOREIGN PATENT DOCUMENTS

DE      202011051135 U1 * 11/2011 ................ F16B 7/06

OTHER PUBLICATIONS

Machine Translation of DE 20 2011 051 135, obtained Jan. 8, 2021.*
U.S. Appl. No. 16/555,416, filed Aug. 29, 2019, Cuddy et al.

*Primary Examiner* — Richard W Ridley
*Assistant Examiner* — Brian J McGovern
(74) *Attorney, Agent, or Firm* — Dascenzo Gates Intellectual Property Law, P.C.

(57) ABSTRACT

Tie rod assemblies include a tie rod body, a coupling feature having a shaft, a ring positioned on the shaft, and a bushing rotatably coupled to the shaft. At least a portion of the shaft is positioned within the tie rod body, with an external threaded region of the bushing engaged with an internal threaded portion of the tie rod body to couple the coupling feature to the tie rod body. The ring is sized such that it is configured to prevent longitudinal translation of the coupling feature with respect to the bushing, via engagement with the shaft. The shaft is free to rotate within the bushing and within the tie rod body, to provide a tie rod assembly having a swivel end. The bushing may be rotated to adjust the length of the tie rod assembly. Related methods include assembling and adjusting the length of the tie rod assembly.

20 Claims, 9 Drawing Sheets

(56) References Cited

U.S. PATENT DOCUMENTS

| | | | |
|---|---|---|---|
| 8,696,232 B2* | 4/2014 | Sokolihs | B62D 7/20 403/315 |
| 2002/0071719 A1* | 6/2002 | Moore | F16C 7/02 403/322.2 |
| 2004/0005824 A1* | 1/2004 | Zeiger | B63H 20/12 440/63 |

* cited by examiner

ADJUSTABLE TIE ROD ASSEMBLIES HAVING A SWIVEL END AND RELATED METHODS

RELATED APPLICATION

This application claims priority to Russia Patent Application No. 2020103575 entitled ADJUSTABLE TIE ROD ASSEMBLIES HAVING A SWIVEL END, AND RELATED METHODS, which was filed on Jan. 28, 2020, and the complete disclosure of which is hereby incorporated by reference.

FIELD

The present disclosure relates generally to tie rod assemblies and related methods, and more particularly to tie rod assemblies having swivel ends and that are configured to be adjusted in length.

BACKGROUND

Tie rods are structural components having pins or hinge supports at both ends that are designed to withstand tensile and/or compressive loads along the longitudinal axis of the tie rods. Such tie rods are commonly used in various industries, including but not limited to aviation, automotive, mass transit, and static construction, to "tie" one structural member to another, and/or to transfer movement and forces across components. For example, in aircraft, tie rods may be used to transfer forces across cabin equipment, floor panels, walls, stow bins, closets, and/or crew quarters.

During assembly, manufacturing, production, and/or installation of structures, such as an aircraft, tolerance variations and stack-ups may accumulate. To accommodate and/or account for such tolerance variations, adjustable length tie rods are sometimes employed. Tie rods with adjustable ends may be useful to allow for installation in different locations or arrangements. However, conventional tie rods that are available with fixed or adjustable lengths only have limited adjustability at the ends provided by spherical bearings. Other conventional tie rods include swivel ends that allow for more adjustability at the ends, but these tie rods are limited by their fixed length.

SUMMARY

To address these and other issues in the prior art, presently disclosed tie rod assemblies may be configured to be adjustable in length and have one or more swivel ends such that they may be utilized in a plurality of different locations or arrangements, thereby reducing the number of different parts that may be needed in some assemblies. The swivel end(s) may allow presently disclosed adjustable tie rods to be used in different locations or orientations without needing multiple different parts for each given orientation or location. Presently disclosed adjustable tie rods also provide flexibility in use by virtue of combining the features of having a swivel end and an adjustable length.

In an example, a tie rod assembly has a tie rod body extending longitudinally along a longitudinal axis from a first end region to a second end region, a first coupling feature, a ring, and a bushing. The tie rod body includes a first internal threaded portion within the first end region. The first coupling feature has a first coupling end and a first shaft that extends longitudinally from the first coupling end. The first coupling feature is engaged with the tie rod body such that at least a portion of the first shaft is positioned within the first end region of the tie rod body. The ring is positioned on a grooved region of the first shaft, wherein an inner diameter of the ring is smaller than a first diameter of a first region of the first shaft. The inner diameter of the ring also is smaller than a second diameter of a second region of the first shaft, with the grooved region of the first shaft being positioned between the first region and the second region of the first shaft. The bushing is rotatably coupled to the first region of the first shaft such that the first shaft is free to rotate within the bushing, about the longitudinal axis. The bushing comprises an external threaded portion that is configured to engage the first internal threaded portion of the tie rod body, thereby coupling the first coupling feature to the tie rod body. The tie rod assembly is configured such that the ring substantially prevents longitudinal translation of the first shaft with respect to the bushing when the first shaft and the ring are positioned within the tie rod body.

Methods of assembling a tie rod assembly are also disclosed. In an example, a method includes sliding a bushing onto a first region of a shaft of a coupling feature to rotatably couple the bushing to the first region of the shaft such that the shaft is free to rotate within the bushing, about a longitudinal axis of the tie rod assembly. The method further includes positioning a ring on a grooved region of the shaft of the coupling feature. The method further includes inserting the ring into a tie rod body while the ring is positioned on the shaft, such that at least a portion of the shaft is also positioned within the tie rod body, and engaging an external threaded portion of the bushing with an internal threaded portion of the tie rod body of the tie rod assembly. Engaging the external threaded portion of the bushing serves to couple the coupling feature to the tie rod body to form the tie rod assembly. In the method, an inner diameter of the ring is smaller than a first diameter of the first region of the shaft, and the inner diameter of the ring is smaller than a second diameter of a second region of the shaft, with the grooved region of the shaft being positioned between the first region and the second region. In this manner, the tie rod assembly is assembled such that it is configured such that the ring substantially prevents longitudinal translation of the shaft with respect to the bushing when the shaft and the ring are positioned within the tie rod body.

DESCRIPTION

Figure 1:
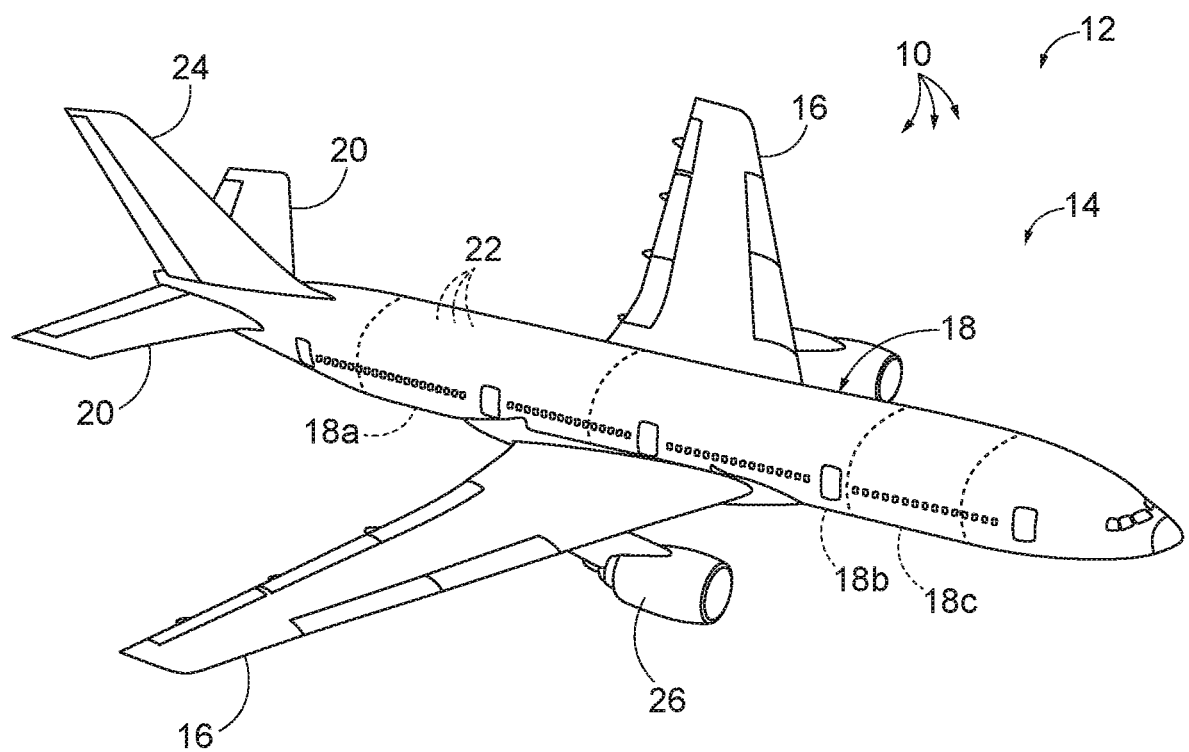
FIG. 1 is a perspective view of an aircraft which may include one or more presently disclosed adjustable tie rod assemblies.

With reference to FIG. 1, one or more tie rod assemblies 10 may be included in an apparatus 12. Tie rod assemblies 10 may be utilized in many different industries and applications, such as aerospace, automotive, electronic, construction, military, recreation, and/or motorsport industries. In FIG. 1, an example of apparatus 12 that may include one or more tie rod assemblies 10 generally is illustrated in the form of an aircraft 14. Aircraft 14 may take any suitable form, including commercial aircraft, military aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) rotorcraft and helicopters.

Apparatus 12 (e.g., aircraft 14) may include one or more tie rod assemblies 10. As illustrative, non-exclusive examples, tie rod assemblies 10 may be utilized in such aircraft structures as wings 16, fuselages 18 or fuselage sections 18a, 18b, 18c, horizontal stabilizers 20, overhead storage bins 22, vertical stabilizers 24, and engine housings 26; however, other components of aircraft 14 additionally or alternatively may include one or more tie rod assemblies 10. Other applications in aircraft 14 for tie rod assemblies 10 may include floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, examples of apparatus 12 (including one or more tie rod assemblies 10) may include or be a portion of space satellites, electronic radome construction, transit vehicles, shipping containers, shelters, large antennae or disk reflectors, refrigeration panels, rapid transit floor panels, shipboard electronic deck shelters, cargo pallets, automobile bodies, architectural curtain walls, partitions, divider panels, expandable hospital shelters, and/or interior structures of an assembly.

Figure 2:
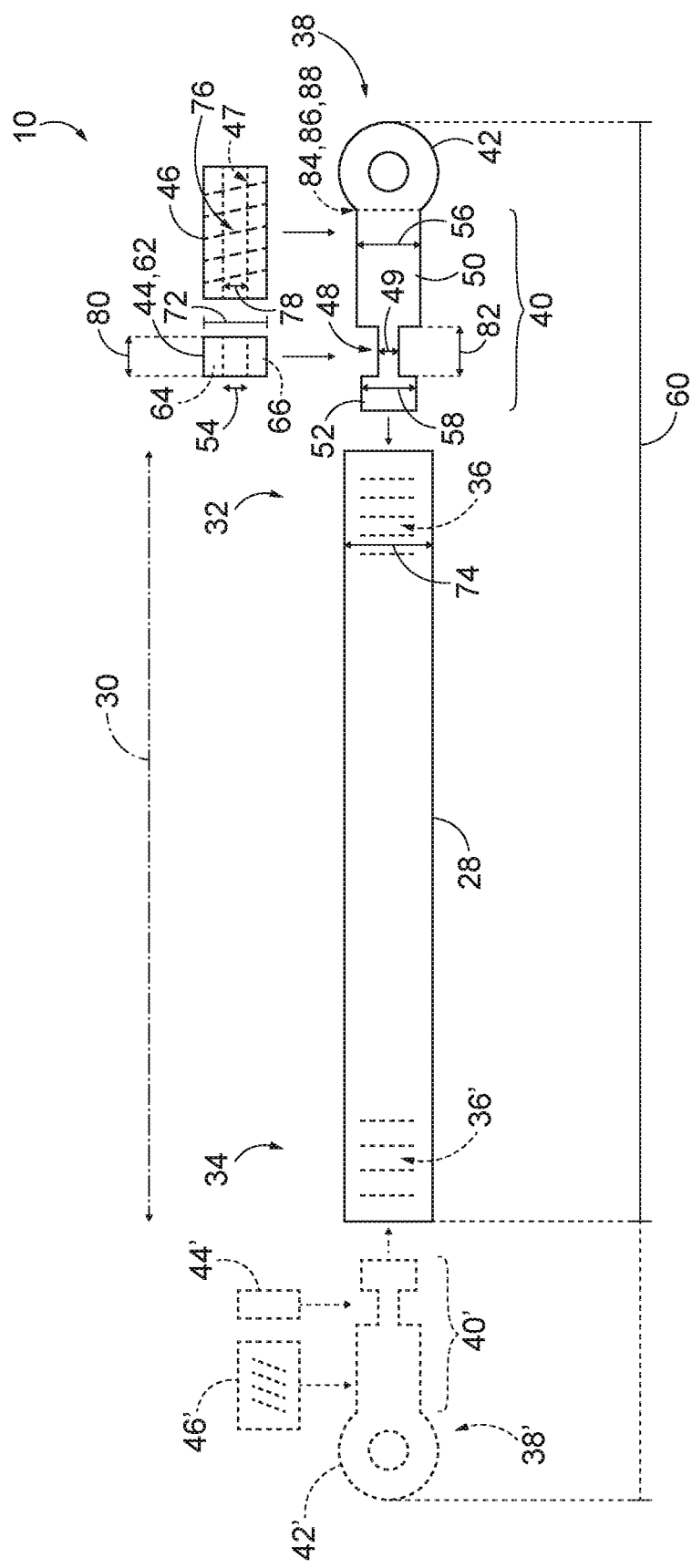
FIG. 2 is a schematic, black-box representation of presently disclosed tie rod assemblies.

FIG. 2 provides illustrative, non-exclusive examples of tie rod assemblies 10 according to the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a given example without departing from the scope of the present disclosure.

Tie rod assembly 10 includes a tie rod body 28 that extends longitudinally along a longitudinal axis 30 of tie rod assembly 10. Tie rod body 28 extends from a first end region 32 to a second end region 34 and includes an internal threaded portion 36 within first end region 32. A coupling feature 38 is engaged with tie rod body 28 such that at least a portion of a shaft 40 of coupling feature 38 is positioned within first end region 32 of tie rod body 28. FIG. 2 illustrates tie rod assembly 10 in an unassembled, exploded view, with coupling feature 38 illustrated outside of tie rod body 28, for clarity. Coupling feature 38 is illustrated in the orientation it has with respect to tie rod body 28 when coupling feature 38 is engaged with tie rod body 28, and thus coupling feature 38 also extends longitudinally (e.g., along longitudinal axis 30). Specifically, shaft 40 of coupling feature 38 extends longitudinally from a first coupling end 42 of coupling feature 38.

Tie rod assembly 10 also includes a ring 44 and a bushing 46. Ring 44 is positioned on a grooved region 48 of shaft 40. As shown in FIG. 2, grooved region 48 is positioned between a first region 50 of shaft 40 and a second region 52 of shaft 40, with a grooved region diameter 49 of grooved region 48 being smaller than the respective diameters of the first and second regions 50, 52 of shaft 40. Specifically, grooved region diameter 49 may be smaller than a first diameter 56 of first region 50 of shaft 40 and/or smaller than a second diameter 58 of second region 52 of shaft 40.

Figure 3:
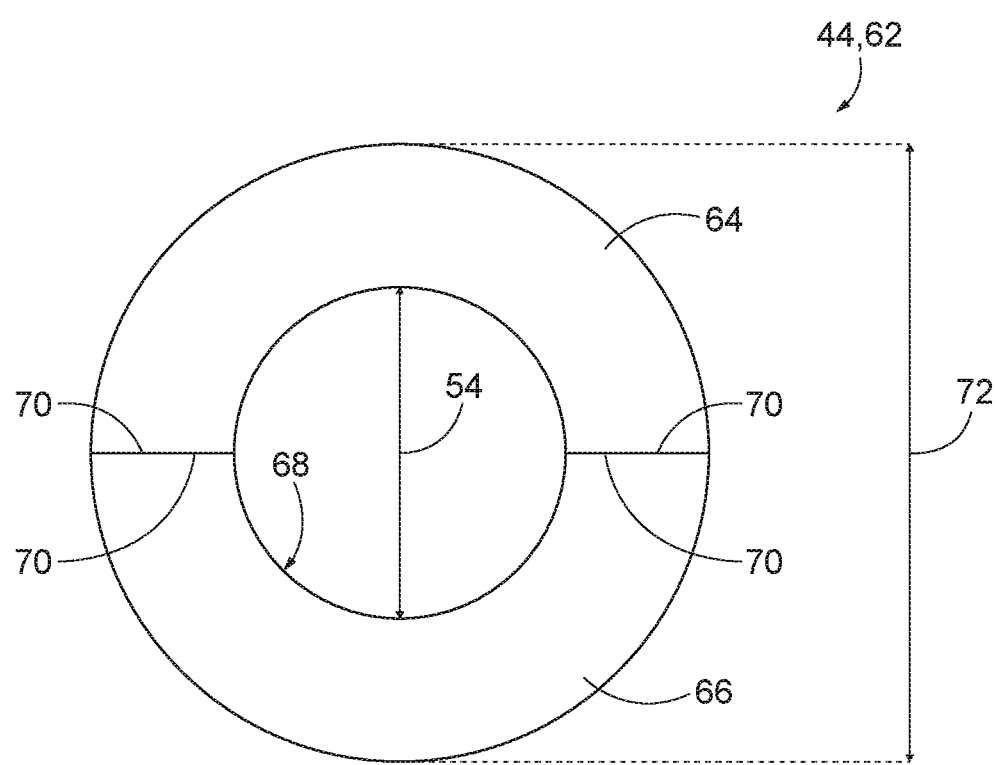
FIG. 3 is a schematic, cross-sectional view of an example of a ring of presently disclosed tie rod assemblies.

An inner diameter 54 of ring 44 may be substantially equal to or slightly larger than grooved region diameter 49. In various examples, ring 44 may have a friction fit or slip fit on grooved region 48. However, inner diameter 54 of ring 44 generally is smaller than first diameter 56 of first region 50 of shaft 40. Inner diameter 54 of ring 44 further is smaller than second diameter 58 of second region 52 of shaft 40. In this manner, when ring 44 is positioned on grooved region 48 of shaft 40, the size of inner diameter 54 of ring 44 relative to the respective diameters 56, 58 of first and second regions 50, 52 of shaft 40 is configured to prevent longitudinal translation of ring 44 with respect to shaft 40. In other words, ring 44 is prevented from being longitudinally translated onto first region 50 of shaft 40 because inner diameter 54 of ring 44 is too small for ring 44 to be positioned on first region 50. Similarly, ring 44 is prevented from being longitudinally translated onto second region 52 of shaft 40 because inner diameter 54 of ring 44 is too small for ring 44 to be positioned on second region 52. In this manner, ring 44 is sized relative to first and second regions 50, 52 of shaft 40 such that ring 44 is constrained on grooved region 48 when ring 44 and at least a portion of shaft 40 are positioned within tie rod body 28, when coupling feature 38 is engaged with tie rod body 28 (i.e., when tie rod assembly 10 is assembled). In other words, tie rod body 28 may be configured to contain ring 44 when tie rod assembly 10 is assembled. In examples where ring 44 is a split ring (e.g., split ring 62 as shown in FIG. 3), tie rod body 28 may be configured to prevent the split ring from splitting apart and/or from separating from grooved region 48 of shaft 40 when tie rod assembly 10 is assembled.

When tie rod assembly 10 is assembled, grooved region 48 and second region 52 are generally positioned within tie rod body 28. In this manner, tie rod assembly 10 is configured such that engagement between second region 52 of shaft 40 and ring 44 retains coupling feature 38 within tie rod body 28 when tie rod assembly 10 is assembled, by preventing shaft 40 from being pulled out from bushing 46 and thereby preventing removal of coupling feature 38 from tie rod body 28 until bushing 46 is selectively unscrewed from tie rod body 28 (e.g., until external threaded portion 76 of bushing 46 is selectively disengaged from, or unscrewed from, internal threaded portion 36 of tie rod body 28). First diameter 56 may be equal, or at least substantially equal to (i.e., within tolerances of) second diameter 58, in some examples.

Bushing 46 is rotatably coupled to first region 50 of shaft 40 such that shaft 40 is free to rotate within bushing 46 (e.g., within a bore 47 of bushing 46), about longitudinal axis 30. In this manner, coupling end 42 of coupling feature 38 may be said to be a swivel end, as coupling end 42 may rotate with respect to tie rod body 28 in order to allow for use of tie rod assembly 10 in a plurality of different locations and/or orientations within a structure. In other words, by providing coupling end 42 as a swivel end as described herein, along with adjustability of an overall length 60 of tie rod assembly 10, disclosed tie rod assemblies 10 may take the place of a plurality of different conventional tie rods that may be needed in different locations in a structure. For example, presently disclosed tie rod assemblies 10 with swivel ends may be used in a first position, or configuration, where coupling end 42 has a first orientation with respect to tie rod body 28, and also in a second position, or configuration, wherein coupling end 42 has a second orientation with respect to tie rod body 28. Coupling end 42 is generally used to secure tie rod assembly 10 to a structure, in use.

For example, first diameter 56 of first region 50 of shaft 40 may be less than an inner bushing diameter 78 of bore 47 of bushing 46. In this manner, first region 50 of shaft 40 may be longitudinally inserted into, or passed into, bore 47 of bushing 46. Similarly, second diameter 58 of second region 52 of shaft 40 may be less than inner bushing diameter 78 of bore 47 of bushing 46 such that second region 52 may be inserted into, or passed into, bore 47. In other words, shaft 40 may be sized relative to bore 47 of bushing 46 such that shaft 40 may be inserted into or through bushing 46 in order to position bushing 46 on shaft 40 (e.g., on first region 50 of shaft 40). Thus, bushing 46 may be configured to be longitudinally slid onto shaft 40, over second region 52, grooved region 48, and first region 50, until at least some of first region 50 is positioned within bushing 46. In some examples, bushing 46 may be longitudinally slid onto shaft 40 until bushing 46 abuts or is stopped by coupling end 42, which may be enlarged compared to shaft 40. In some examples, second region 52 is positioned outside of bushing 46 when bushing 46 is positioned on shaft 40. Coupling end 42 of coupling feature 38 generally is positioned outside of bushing 46 when bushing 46 is positioned on shaft 40, though in some examples, a portion of coupling end 42 may be positioned within bushing 46.

Bushing 46 includes an external threaded portion 76 that is configured to engage internal threaded portion 36 of tie rod body 28 in order to couple coupling feature 38 to tie rod body 28. In other words, bushing 46 may be screwed into internal threaded portion 36 of tie rod body 28 to couple bushing 46 to tie rod body 28, thereby also coupling coupling feature 38 to tie rod body 28, by virtue of the engagement between coupling feature 38 and bushing 46. When bushing 46 is so engaged with internal threaded portion 36, at least a portion of shaft 40 and at least a portion of bushing 46 are positioned inside tie rod body 28, within first end region 32, and the entire ring 44 is positioned inside tie rod body 28. When bushing 46 is so engaged with tie rod body 28, rotating bushing 46 about longitudinal axis 30 with respect to tie rod body 28 may serve to adjust, or change, overall length 60 of tie rod assembly 10, thereby allowing for selective adjustment of overall length 60. In some examples, rotating bushing 46 in a first direction (e.g., clockwise) with respect to tie rod body 28 may shorten, or reduce overall length 60 of tie rod assembly 10, whereas rotating bushing 46 in the opposite direction (e.g., counterclockwise) with respect to tie rod body 28 may lengthen, or increase overall length 60 of tie rod assembly 10. In some examples, rotating bushing 46 in a first direction (e.g., counterclockwise) with respect to tie rod body 28 may shorten, or reduce overall length 60 of tie rod assembly 10, whereas rotating bushing 46 in the opposite direction (e.g., clockwise) with respect to tie rod body 28 may lengthen, or increase overall length 60 of tie rod assembly 10.

Overall length 60 of tie rod assembly 10 may be adjustable between a range of lengths. For example, tie rod assembly 10 may be adjustable between a minimum overall length configuration (e.g., at the lower end of the range of overall length 60) and a maximum overall length configuration (e.g., at the higher end of the range of overall length 60). In some examples, in the minimum overall length configuration, a first proportion of bushing 46 may be positioned within tie rod body 28, and in the maximum overall length configuration, a second proportion of bushing 46 may be positioned within tie rod body 28, with the first proportion being greater than the second proportion.

When bushing 46 is engaged with tie rod body 28, engagement between ring 44, first region 50 of shaft 40, and second region 52 of shaft 40 prevent removal of shaft 40 from bushing 46. In other words, shaft 40 may be sized relative to bore 47 of bushing 46 such that shaft 40 may be freely inserted and removed from bore 47 along longitudinal axis 30. However, tie rod assembly 10 is configured such that ring 44 prevents removal of shaft 40 from bushing 46 when second region 52 of shaft 40 and ring 44 are positioned within tie rod body 28, by virtue of engagement between second region 52 and ring 44. In other words, second region 52 of shaft 40 may be sized such that it is small enough to be inserted into and removed from bore 47 of bushing 46, but also sized such that it is too large to pass through ring 44. In some examples, ring 44 thereby allows for rotation of shaft 40 with respect to bushing 46 and tie rod body 28, while simultaneously limiting or preventing longitudinal translation of shaft 40 with respect to bushing 46.

In some examples, ring 44 is a split ring 62 composed of two or more parts that are brought together to form ring 44. For example, split ring 62 may be formed of a first cylindrical shell half 64 and a second cylindrical shell half 66, though in other examples, split ring 62 may be formed of three or more parts and/or of parts having different shapes than described in particular examples. FIG. 3 illustrates a schematic, cross-sectional view of an example of split ring 62, which shows first cylindrical shell half 64 and second cylindrical shell half 66 brought together to form a ring bore 68 having inner diameter 54. With reference to FIGS. 2 and 3, split ring 62 may be positioned onto grooved region 48 of shaft 40 such that grooved region 48 is positioned within ring bore 68 of split ring 62. Tie rod body 28 may be configured to prevent first cylindrical shell half 64 and second cylindrical shell half 66 from separating from each other when tie rod assembly 10 is assembled (and therefore when split ring 62 is positioned inside tie rod body 28). Additionally or alternatively, tie rod body 28 may be configured to prevent first cylindrical shell half 64 and second cylindrical shell half 66 from separating from grooved region 48 when tie rod assembly 10 is assembled.

In some examples, first cylindrical shell half 64 and second cylindrical shell half 66 may include one or more interlocking features to aid engagement together. In other examples, first cylindrical shell half 64 and second cylindrical shell half 66 may simply have smooth faces 70 that engage with one another. In other words, in some examples, first cylindrical shell half 64 and second cylindrical shell half 66 may fall off shaft 40 if not positioned within tie rod body 28 or otherwise constrained on shaft 40. In other examples, first cylindrical shell half 64 and second cylindrical shell half 66 may be configured to remain on grooved region 48 until selectively removed. In some examples, first cylindrical shell half 64 and second cylindrical shell half 66 may be positioned on grooved region 48 of shaft 40 by radially moving the halves 64, 66 towards and onto grooved region 48. In other words, in some examples, split ring 62 may be positioned onto grooved region 48 without longitudinally inserting shaft 40 through or into split ring 62. In other examples, ring 44 may be elastic and/or moldable such that it may be stretched and/or molded onto grooved region 48.

With reference to FIGS. 2 and 3, an external diameter 72 of ring 44 generally is sized relative to bushing 46 to prevent ring 44 from being positioned inside bore 47 of bushing 46. In other words, external diameter 72 of ring 44 may be large enough to prevent and/or limit longitudinal translation of bushing 46 with respect to shaft 40 because ring 44 may be sized to be too large relative to bushing 46 to allow movement of bushing 46 past ring 44. In some examples, ring 44 may be positioned to contact, press against, and/or abut, bushing 46. On the other hand, external diameter 72 of ring 44 may be less than an inner thread diameter 74 of internal threaded portion 36 such that ring 44 may be passed through internal threaded portion 36 without having a threaded engagement with internal threaded portion 36. In other words, ring 44 may be freely longitudinally inserted into tie rod body 28. Similarly, second diameter 58 of second region 52 of shaft 40 of coupling feature 38 may be smaller than inner thread diameter 74 such that second region 52 may be passed through internal threaded portion 36 of tie rod body 28 without engaging the threads of internal threaded portion 36 (e.g., without being threaded into internal threaded portion 36).

With reference again to FIG. 2, ring 44 may have a ring length 80, defined along longitudinal axis 30 when ring 44 is positioned on shaft 40. Similarly, grooved region 48 of shaft 40 may have a grooved region length 82 defined along longitudinal axis 30. In some examples, ring length 80 is less than or equal to grooved region length 82 such that ring 44 may be positioned on shaft 40 such that ring 44 is entirely seated within grooved region 48. In some examples, ring length 80 is substantially equal to grooved region length 82 such that ring 44 may be placed onto grooved region 48 with little to no extra space, such that first region 50 and second region 52 limits and/or substantially prevents longitudinal movement or translation of ring 44 with respect to shaft 40 (e.g., with respect to grooved region 48 of shaft 40) when ring 44 is positioned on grooved region 48. In some examples, bushing 46, first region 50, and/or second region 52 may contact ring 44 such that ring 44 is longitudinally compressed between bushing 46 and second region 52 of shaft 40. Ring 44 is generally sized relative to grooved region 48 such that ring 44 covers a majority of the surface area of grooved region 48 when ring 44 is positioned on grooved region 48, though in some examples of tie rod assembly 10, ring 44 may be relatively smaller with respect to grooved region 48 such that ring 44 does not cover a majority of the surface area of grooved region 48. In some examples, ring 44 may be sized relative to grooved region 48 such that ring 44 substantially covers the entire grooved region 48 when ring 44 is positioned on grooved region 48. Generally, ring length 80 is sufficient to withstand shearing off under tension, and sufficient to prevent second region 52 of shaft 40 from passing through ring 44. Similarly, a length of second region 52 of shaft 40 may be sufficient to withstand shearing off under tension.

In some examples, coupling feature 38 is a first coupling feature 38, coupling end 42 is a first coupling end 42, and shaft 40 is a first shaft 40, with tie rod assembly 10 also including a second coupling feature 38' engaged within second end region 34 of tie rod body 28. Second coupling feature 38' also may include a corresponding second shaft 40' extending longitudinally from a second coupling end 42' and may be configured to be engaged with tie rod body 28 in a similar manner as described above in connection with coupling feature 38, via a second ring 44' and a second bushing 46'. Second bushing 46' may have a threaded engagement with a second internal threaded portion 36' (i.e. internal threaded portion 36 may be a first internal threaded portion 36 and tie rod body 28 may include second internal threaded portion 36' within second end region 34) such that second coupling feature 38' may be engaged with second end region 34 of tie rod body 28. In other words, various disclosed examples of tie rod assembly 10 may include one or two coupling features 38, with each coupling feature 38 providing a swivel end and/or adjustment for the overall length of tie rod assembly 10.

Tie rod assembly 10 may include a locking mechanism 84, in some examples. Locking mechanism 84, when engaged, may be configured to prevent changes to overall length 60 of tie rod assembly 10. For example, locking mechanism 84 may include a lock wire 86 configured to prevent longitudinal movement of bushing 46 with respect to tie rod body 28, thereby preventing adjustment of overall length 60 of tie rod assembly 10 until lock wire 86 is selectively unlocked. Additionally or alternatively, locking mechanism 84 may include a jam nut 88 configured to prevent longitudinal movement of bushing 46 with respect to tie rod body 28, thereby preventing adjustment of overall length 60 of tie rod assembly 10 until jam nut 88 is selectively unlocked.

In some examples, bushing 46 is a monolithic, or singular integral body. Additionally or alternatively, first coupling feature 38 may be a monolithic, or singular integral body. In some examples, coupling feature 38 may be composed of two or more parts coupled together. For example, second region 52 of shaft 40 may be removably coupled to the rest of shaft 40. In some examples, tie rod assembly 10 is configured to be adjusted in place in a structural assembly, and/or is configured to be adjusted under load. For example, given examples of tie rod assembly 10 may be configured such that coupling feature 38 may be rotated with respect to tie rod body 28, and/or bushing 46 may be rotated with respect to tie rod body 28 to adjust overall length 60, after tie rod assembly 10 is installed in a structure and loaded via physical connections to first coupling end 42 and/or second coupling end 42'.

Turning now to FIGS. 4-13, illustrative non-exclusive examples of tie rod assemblies 10 and components thereof are illustrated. Where appropriate, the reference numerals from the schematic illustrations of FIGS. 2-3 are used to designate corresponding parts in FIGS. 4-13, however, the examples of FIGS. 4-13 are non-exclusive and do not limit tie rod assemblies 10 to the illustrated examples of FIGS. 4-13. That is, tie rod assemblies 10 are not limited to the specific examples illustrated and may incorporate any number of the various aspects, configurations, characteristics, properties, etc. of tie rod assemblies 10 that are illustrated in and discussed with reference to the schematic representations of FIGS. 2-3 and/or the examples of FIGS. 4-13, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again in FIGS. 4-13, however, it is within the scope of the present disclosure that the previously discussed features, variants, etc. may be utilized with the same.

Figure 4:
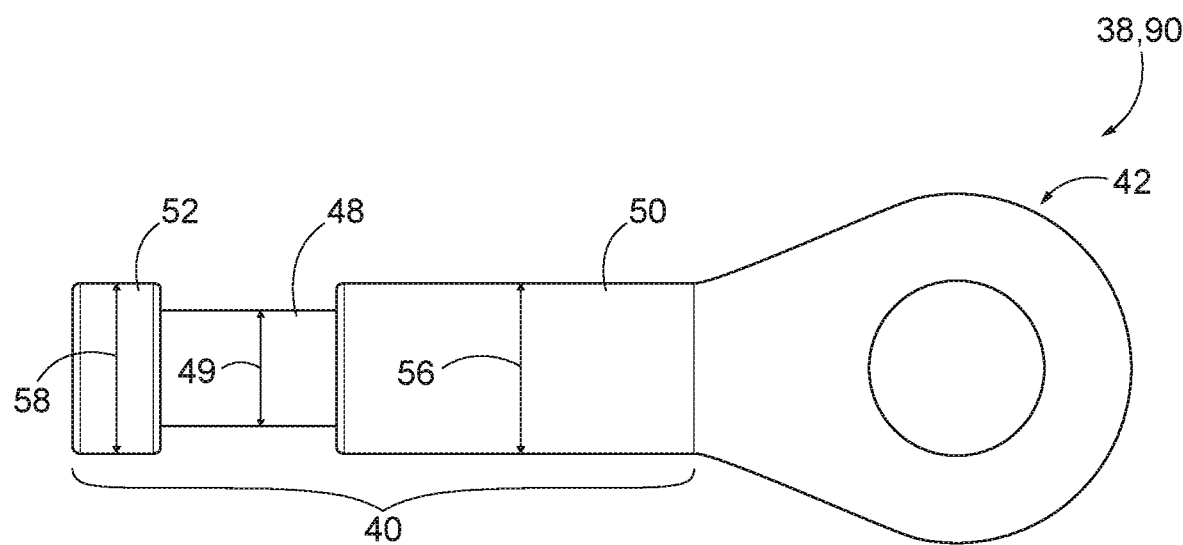
FIG. 4 is an elevation view of an example of a coupling feature of presently disclosed tie rod assemblies.

FIG. 4 illustrates an example of coupling feature 38, in the form of coupling feature 90, shown apart from other components, for clarity. Coupling feature 90 shows shaft 40 extending longitudinally from coupling end 42, which is configured to couple tie rod assembly 10 to one or more structures. Shaft 40 includes first region 50 having first diameter 56, second region 52 having second diameter 58, and grooved region 48 (having grooved region diameter 49) positioned therebetween. In the example of coupling feature 90, second diameter 58 of second region 52 is substantially equal to first diameter 56 of first region 50, with grooved region diameter 49 of grooved region 48 being smaller than first diameter 56 and second diameter 58. In other examples of coupling feature 38, other respective diameters of the various regions 48, 50, 52 of shaft 40 are also within the scope of the present disclosure, as described above in connection with FIG. 2.

Figure 5:
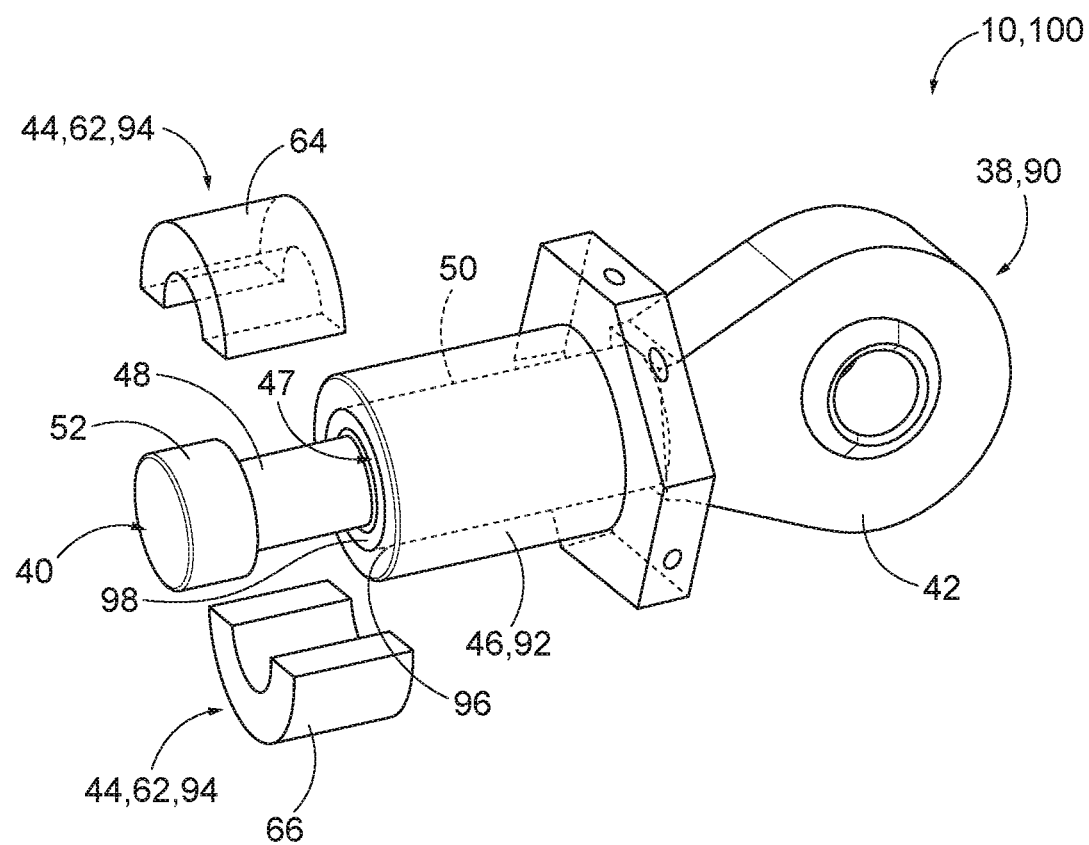
FIG. 5 is a perspective, partial exploded view of a tie rod assembly.

FIG. 5 illustrates coupling feature 90 having an example of bushing 46 (in the form of a bushing 92) positioned on first region 50 of shaft 40, thereby forming tie rod assembly 100, which is an example of tie rod assembly 10. Bushing 92 has approximately the same length as first region 50 of shaft 40, such that when bushing 92 is positioned on shaft 40, it at least substantially covers the entire first region 50. Bushing 92 may extend along first region 50 of shaft 40 from coupling end 42. In other examples, bushing 92 may not extend the entire length of first region 50. In the example shown in FIG. 5, first diameter 56 (FIG. 4) of first region 50 is slightly smaller than inner bushing diameter 78 (FIG. 2) of bushing 92 such that first region 50 of shaft 40 is free to rotate within bushing 92. In some examples, a distal face 96 of bushing 92 may be substantially flush with a distal end face 98 of first region 50, at the interface with grooved region 48.

Figure 6:
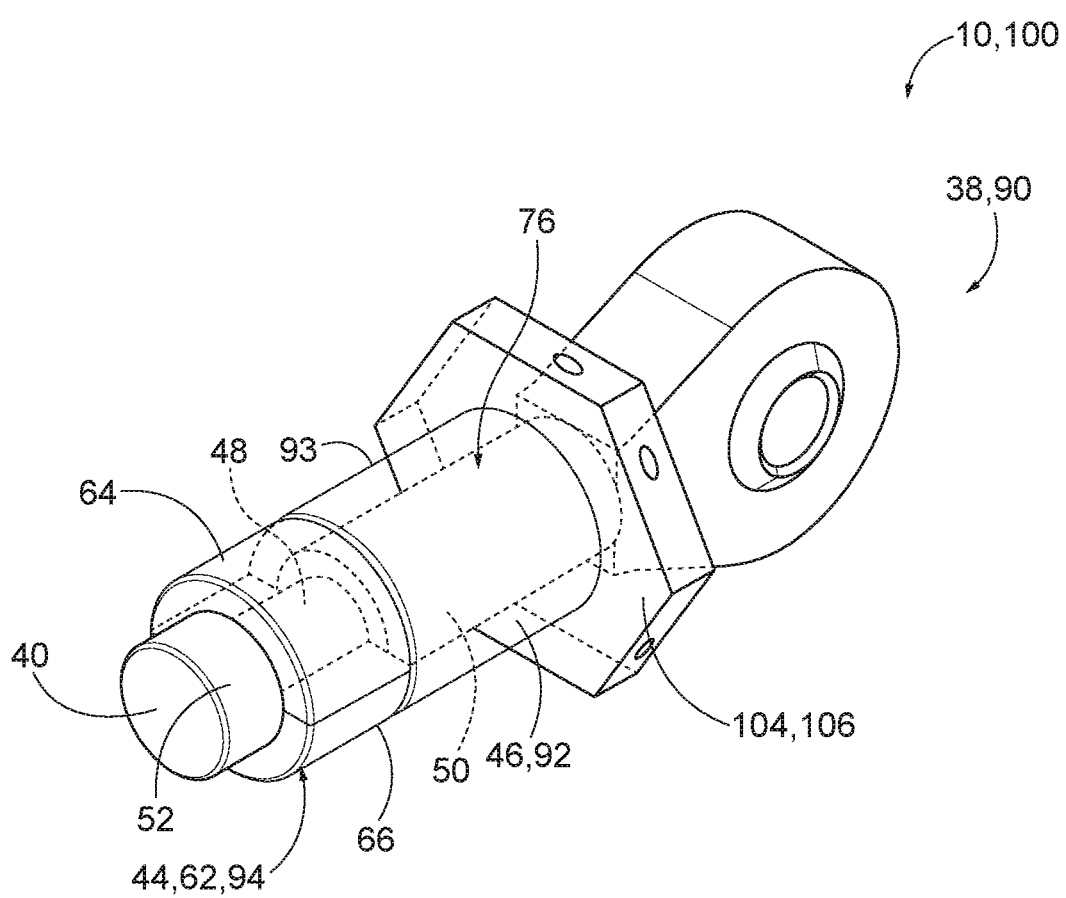
FIG. 6 is a perspective view of the tie rod assembly of FIG. 5, with the split ring positioned on the shaft.

FIG. 5 also illustrates split ring 94 (which is an example of split ring 62, which is an example of ring 44) in the process of being positioned on grooved region 48 of shaft 40 of coupling feature 90. FIG. 6 shows split ring 94 completely positioned on grooved region 48, with split ring 94 being in contact with second region 52, first region 50, and bushing 92. As discussed above, in other examples of ring 44, ring 44 may be relatively smaller such that it does not contact both second region 52 and bushing 46. An exterior surface 93 of bushing 92 is understood to include external threaded portion 76, though the threads are not illustrated in FIG. 6.

Figure 7:
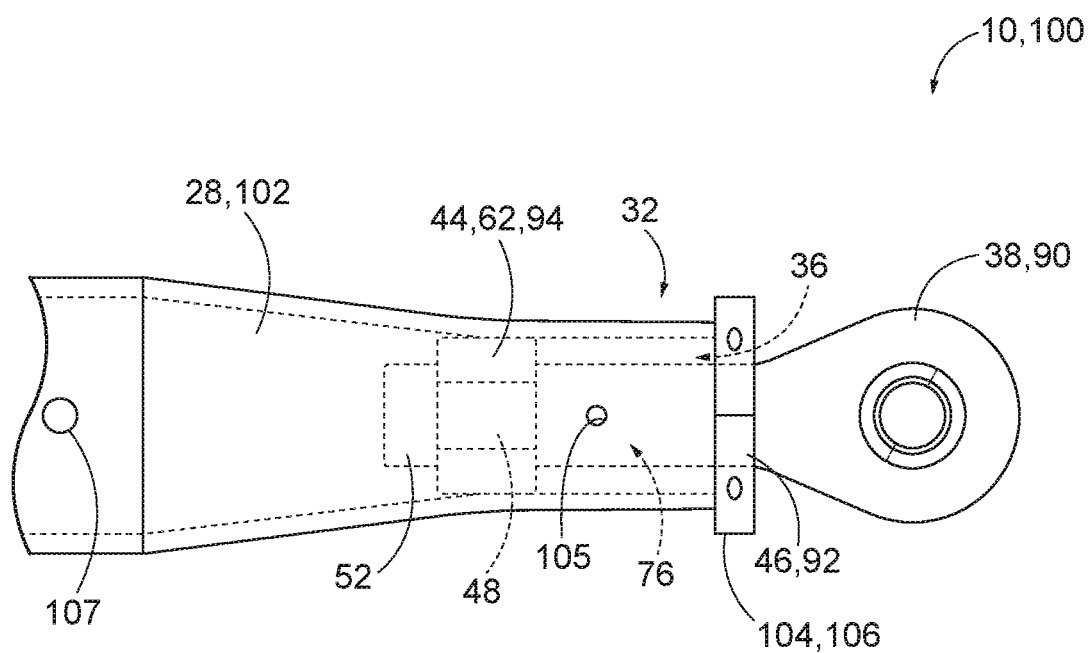
FIG. 7 is an elevation view of the tie rod assembly of FIG. 6, shown engaged with a tie rod body and in a minimum length configuration.
Figure 8:
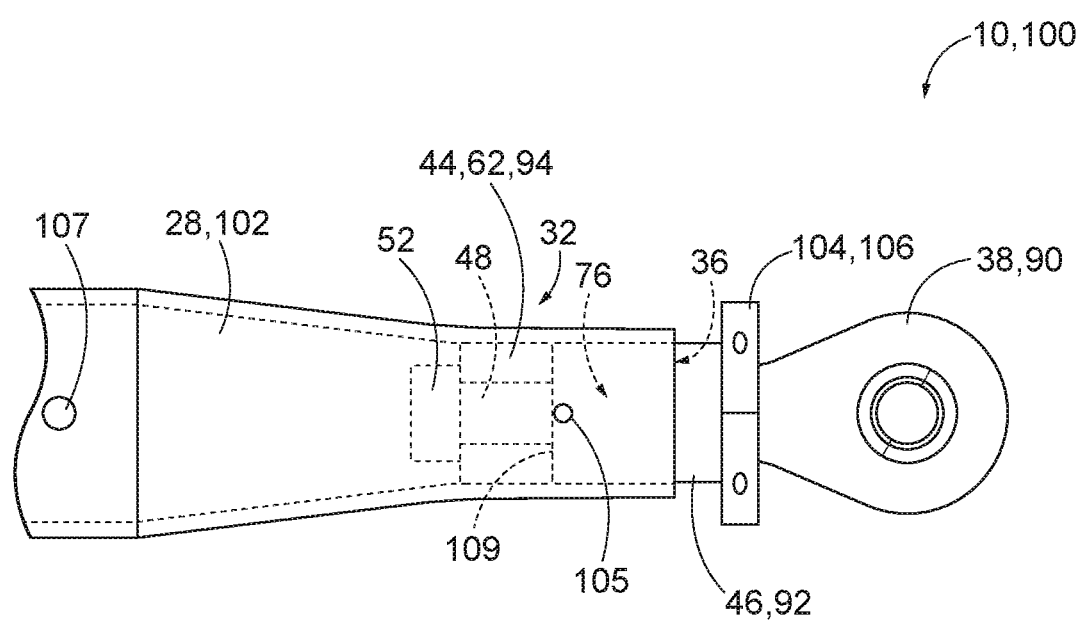
FIG. 8 is an elevation view of the tie rod assembly of FIG. 7, shown in a maximum length configuration.
Figure 12:
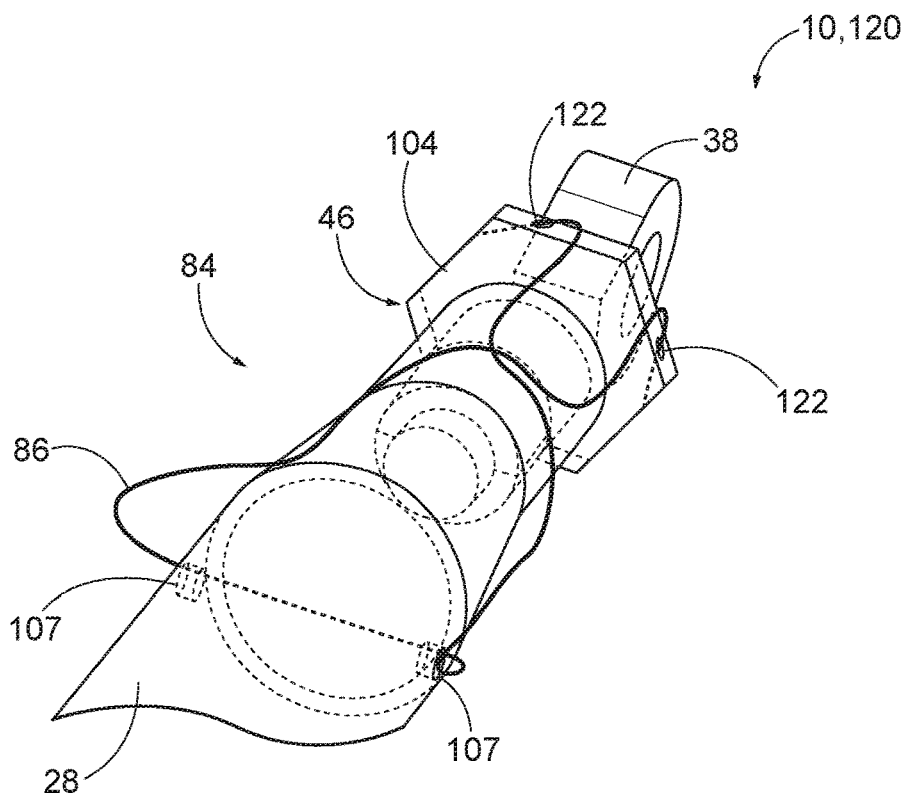
FIG. 12 is a perspective view of an example of a tie rod assembly having a locking mechanism.

FIGS. 7-8 illustrate tie rod assembly 100 as shown in FIG. 6 engaged with tie rod body 102 (which is an example of tie rod body 28) of tie rod assembly 100. In FIGS. 7-8, a portion of coupling feature 90 (e.g., second region 52, grooved region 48, and a portion of first region 50 of shaft 40), a portion of bushing 92, and split ring 94 are all positioned within tie rod body 102. To engage coupling feature 90 with tie rod body 102, external threaded portion 76 of bushing 92 is engaged with (e.g., threaded into) internal threaded portion 36 of tie rod body 102, which is illustrated as being positioned within first end region 32 of tie rod body 102. Because coupling feature 90 is prevented from being pulled out from bushing 92 due to second region 52 of shaft 40 being unable to pass through split ring 94 when contained within tie rod body 102, screwing bushing 92 into tie rod body 102 effectively couples coupling feature 90 to tie rod body 102. As best seen in FIGS. 7-8, various examples of tie rod assembly 10, including tie rod assembly 100, may include one or more witness holes 105 formed in tie rod body 28. Witness hole 105 may be formed through the entire thickness of tie rod body 28 such that bushing 92 may be visible through witness hole 105 when bushing 92 is inserted into tie rod body 28. In some examples, witness hole 105 may be used to verify that bushing 92 is inserted into tie rod body 28 a sufficient amount. In other words, if engagement along a minimum length of internal threaded portion 36 of tie rod body 28 and external threaded portion 76 of bushing 92 is desired, witness hole 105 may be positioned relative to tie rod body 28 to serve as a check that the minimum overlap between internal threaded portion 36 and external threaded portion 76 has been achieved. For example, as shown in FIG. 8, a distal edge 109 of bushing 92 is positioned past the entire witness hole 105, which is apparent by viewing bushing 92 through witness hole 105, thereby indicating that bushing 92 is sufficiently engaged with tie rod body 28, in this example. Additionally or alternatively, tie rod body 28 may include one or more drain holes 107, which may be used, for example, to engage locking mechanism 84 (FIG. 2; FIG. 12). Drain hole 107 may be larger than witness hole 105, in some examples, though in other examples, drain hole 107 may be smaller than or substantially equal in size to witness hole 105.

FIG. 7 illustrates tie rod assembly 100 in a minimum length configuration and FIG. 8 illustrates tie rod assembly 100 in a lengthened configuration. To adjust the length of tie rod assembly 100 between the configuration shown in FIG. 7 and the configuration shown in FIG. 8, bushing 92 is selectively rotated with respect to tie rod body 102. In the shortened configuration shown in FIG. 7, bushing 92 has been rotated with respect to tie rod body 102 until a head portion 104 of bushing 92 abuts tie rod body 102, thereby preventing further rotation or tightening of bushing 92 with respect to tie rod body 102. In other examples, tie rod assembly 100 may include a stop or other mechanism that limits tightening of bushing 92 prior to the point of contact with tie rod body 102. To lengthen tie rod assembly 100 towards the configuration shown in FIG. 8, bushing 92 is rotated in the opposite direction with respect to tie rod body 102, and thus is translated with respect to tie rod body 102 by virtue of the threaded engagement between external threaded portion 76 of bushing 92 and internal threaded portion 36 of tie rod body 102.

As shown in FIGS. 6-8, head portion 104 of bushing 92 (or other bushing 46) may be a hex head 106. Hex head 106 (or other head portion 104) may be positioned outside of tie rod body 28, as shown in FIGS. 7-8. For example, head portion 104 may have an outer diameter that is large enough to prevent head portion 104 from being inserted into tie rod body 102. Head portion 104 may facilitate rotation of bushing 92 with respect to tie rod body 102. For example, rotation of hex head 106 about the longitudinal axis of tie rod assembly 100 causes rotation of bushing 92 with respect to tie rod body 102, thereby changing the overall length of tie rod assembly 100 and allowing for selective adjustment of the overall length of tie rod assembly 100. Standard tools may be used to rotate said head portion 104. Rotation of hex head 106 may be performed manually and/or via a standard tool, such as a wrench or socket.

Figure 9:
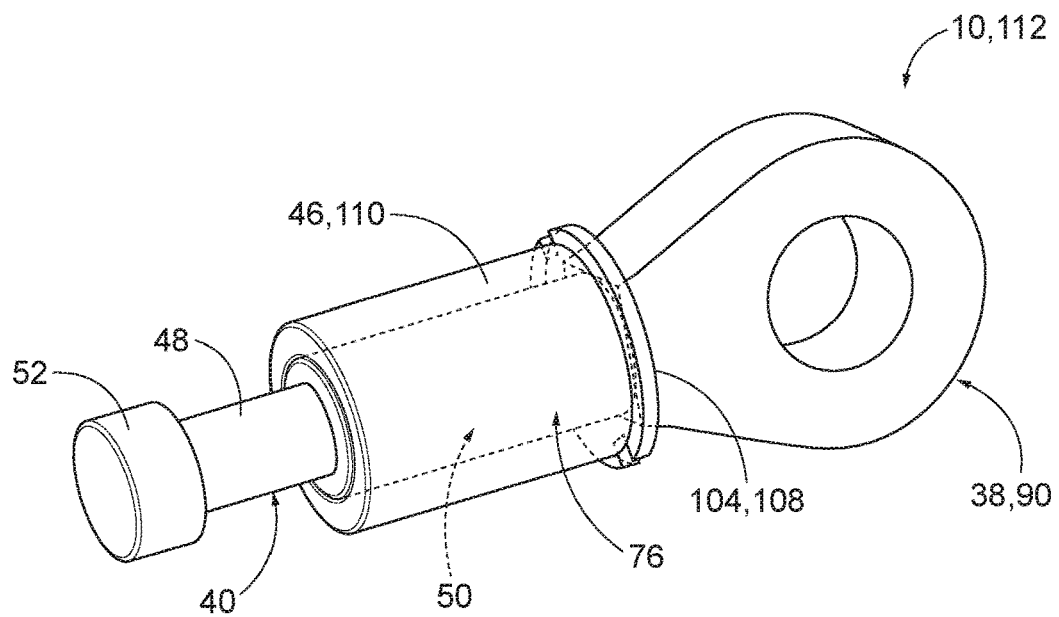
FIG. 9 is a perspective view of another example of a tie rod assembly.
Figure 10:
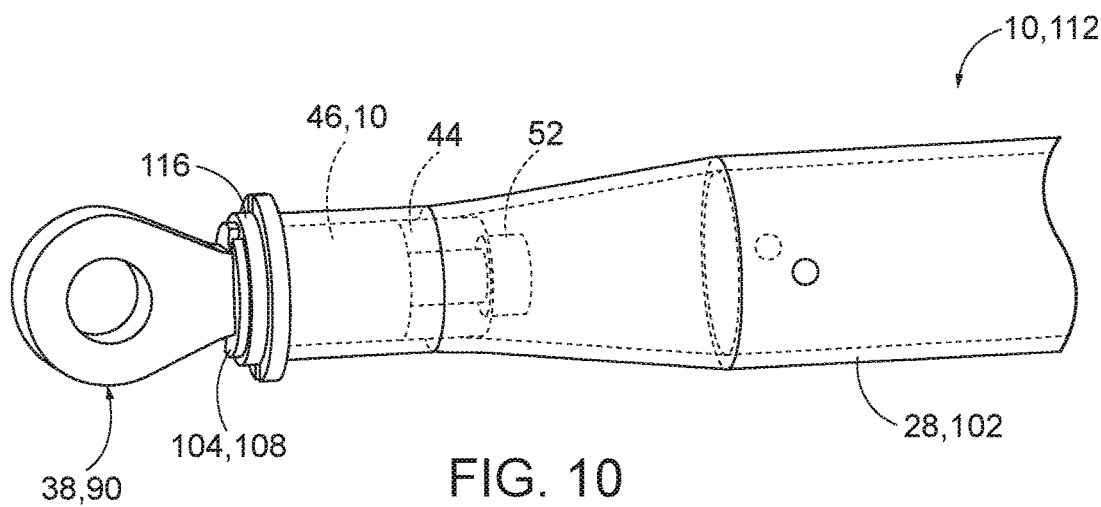
FIG. 10 is an elevation view of the tie rod assembly of FIG. 9 in place within a tie rod body, shown in a minimum length configuration.
Figure 11:
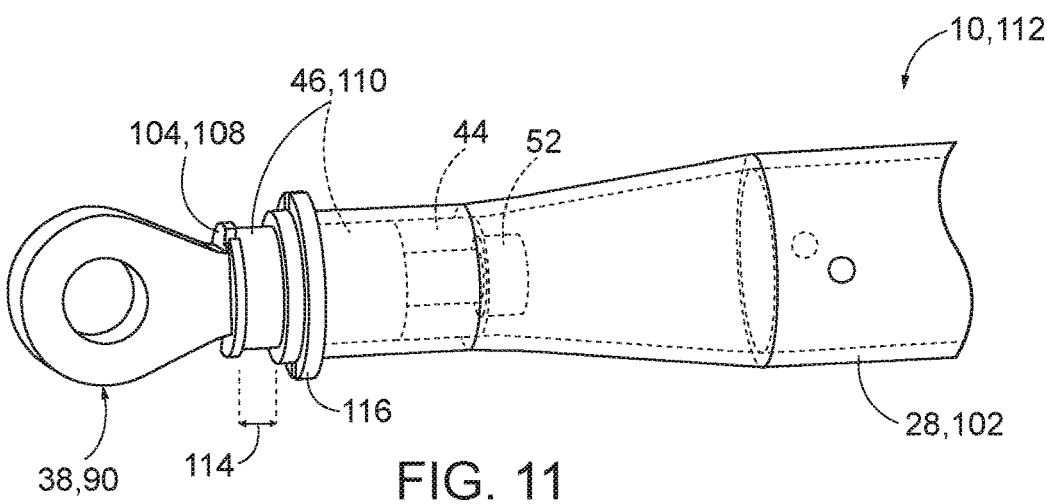
FIG. 11 is an elevation view of the tie rod assembly of FIG. 10, shown in a maximum length configuration.

Additionally or alternatively, head portion 104 may include a pin wrench fitting 108, as shown in tie rod assembly 112 of FIGS. 9-11 (tie rod assembly 112 is an example of tie rod assembly 10). FIG. 9 illustrates coupling feature 90 having a bushing 110 (which is an example of bushing 46) positioned on first region 50 of shaft 40 of coupling feature 90. Similar to the example illustrated in FIGS. 6-8, bushing 110 includes external threaded portion 76 configured to engage with internal threaded portion 36 of tie rod body 102 (FIGS. 10-11). A pin wrench (not shown) may be used to rotate pin wrench fitting 108 about the longitudinal axis and with respect to tie rod body 102, thereby adjusting the overall length of tie rod assembly 112 as described herein. Pin wrench fitting 108 generally is positioned outside of tie rod body 102. For example, pin wrench fitting 108 may have an outer diameter that is large enough to prevent pin wrench fitting 108 from being inserted into tie rod body 102.

FIG. 10 illustrates tie rod assembly 112 in a minimum length configuration, with bushing 110 tightened with respect to tie rod body 102 such that pin wrench fitting 108 is adjacent and/or contacting tie rod body 102. FIG. 11 illustrates tie rod assembly 112 in an extended configuration wherein tie rod assembly 112 has a greater overall length than its length in the minimum length configuration shown in FIG. 10. As shown in FIG. 11, in extended configurations, bushing 110 has been rotated with respect to tie rod body 102 such that bushing 110 is longitudinally translated with respect to tie rod body 102 and pin wrench fitting 108 is spaced apart from tie rod body 102. For example, FIG. 11 illustrates an increase in the overall length of tie rod assembly 112 by a distance 114 as compared to the overall length of tie rod assembly 112 in the configuration shown in FIG. 10.

Tie rod assembly 112 optionally may include a jam nut 116, which may be engaged with pin wrench fitting 108 and tie rod body 102 in the shortened configuration shown in FIG. 10, and which may be engaged with tie rod body 102 but spaced apart from pin wrench fitting 108 in the lengthened configuration shown in FIG. 11.

FIG. 12 illustrates a tie rod assembly 120 (which is an example of tie rod assembly 10), having a locking mechanism 84 in the form of lock wire 86. Lock wire 86 is configured to tie bushing 46 to tie rod body 28 via drain hole 107 in tie rod body 28, thereby substantially preventing rotation of bushing 46 with respect to tie rod body 28 when lock wire 86 is engaged. In the example of FIG. 12, lock wire 86 is secured to tie rod assembly 120 by extending into and/or through holes 122 formed in head portion 104 of bushing 46, as well as through drain holes 107 of tie rod body 28.

Figure 13:
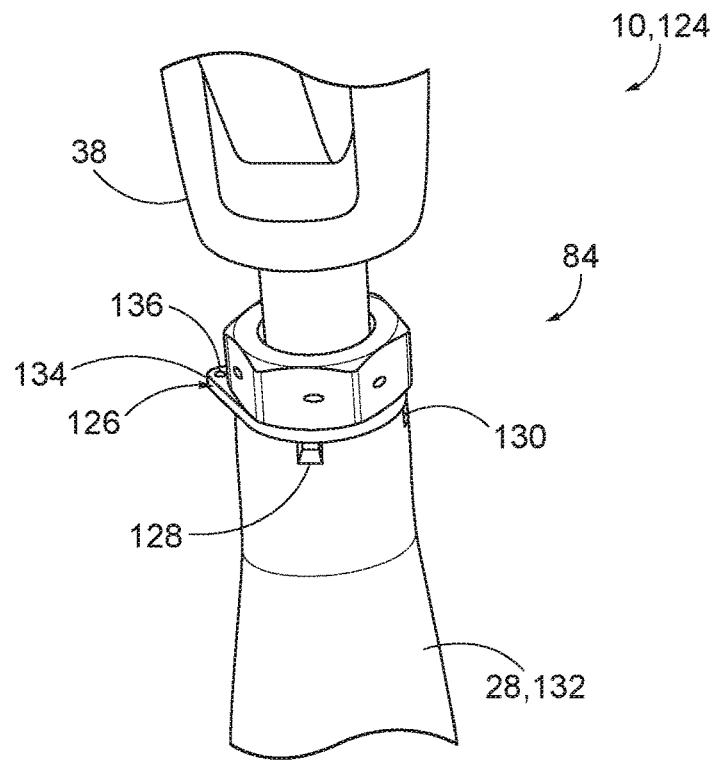
FIG. 13 is a perspective view of another example of a locking mechanism for use with disclosed tie rod assemblies.

In another examples of locking mechanism 84 shown in a tie rod assembly 124 (which is an example of tie rod assembly 10) in FIG. 13, a locking ring 126 may be used to secure a lock wire (e.g., lock wire 86 shown in FIG. 12) to tie rod body 28. Locking ring 126 includes a tab 128 that is configured to fit within a notch 130 formed in a tie rod body 132 (which is an example of tie rod body 28) such that locking ring 126 has a set orientation with respect to tie rod body 132 when tab 128 is engaged with (e.g., positioned within) notch 130. Locking ring 126 also includes an asymmetrical, elongated edge 134 having a hole 136 extending therethrough. A lock wire may be inserted through hole 136 and secured to tie rod body 132 as described above in connection with FIG. 12. Said lock wire may be selectively removed from tie rod assemblies 120, 124 to allow adjustment of the length of the tie rod assembly via rotation of bushing 46 with respect to tie rod body 28.

Figure 14:
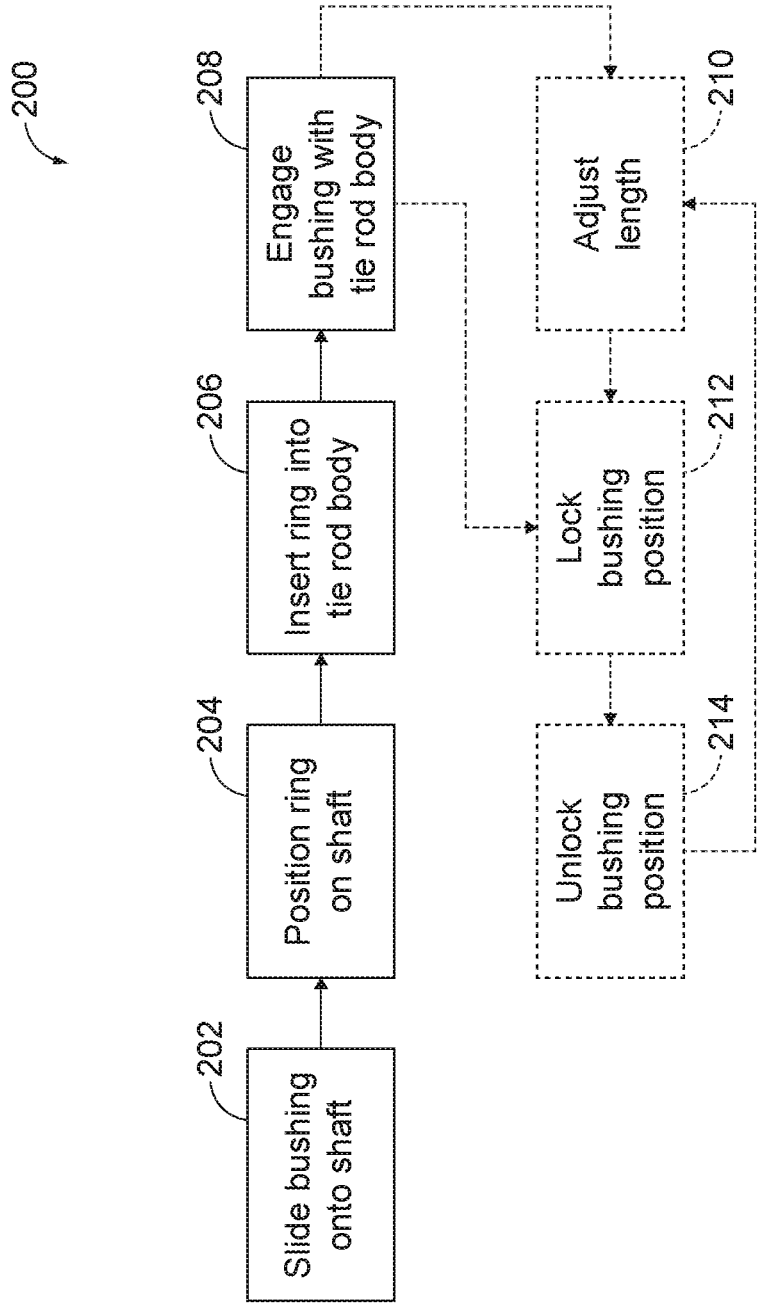
FIG. 14 is a schematic flowchart diagram of methods according to the present disclosure.

FIG. 14 schematically provides a flowchart that represents illustrative, non-exclusive examples of methods 200 of assembling a tie rod assembly according to the present disclosure. The methods 200 and steps illustrated in FIG. 14 are not limiting and other methods and steps are within the scope of the present disclosure, including methods having greater than or fewer than the number of steps illustrated, as understood from the discussions herein.

Methods 200 generally include sliding a bushing (e.g., bushing 46) onto a first region (e.g., first region 50) of a shaft (e.g., shaft 40) of a coupling feature (e.g., coupling feature 38) at 202, positioning a ring (e.g., ring 44) on a grooved region (e.g., grooved region 48) of the shaft at 204, inserting the ring into a tie rod body (e.g., tie rod body 28) at 206, and engaging the bushing with the tie rod body at 208 to couple the coupling feature to the tie rod body, thereby forming a tie rod assembly (e.g., tie rod assembly 10). Sliding the bushing onto the shaft at 202 effectively rotatably couples the bushing to the first region of the shaft such that the shaft is free to rotate within the bushing about a longitudinal axis (e.g., longitudinal axis 30) of the tie rod assembly.

Positioning the ring on the grooved region at 204 may be accomplished by stretching or molding a ring over a second region (e.g., second region 52) of the shaft in order to positon the ring on the grooved region (which has a smaller diameter than either of the first and second regions of the shaft, with the grooved region being positioned between the first and second regions of the shaft along the length of the shaft). In other examples, positioning the ring on the grooved region at 204 may be accomplished by bringing together two or more pieces or parts of a split ring (e.g., first cylindrical shell half 64 and second cylindrical shell half 66 of split ring 62) such that they are engaged with one another and positioned on and around the grooved region of the shaft. The ring is sized relative to the first and second regions of the shaft such that positioning the ring on the grooved region at 204 effectively prevents longitudinal translation of the ring onto the first region or second region of the shaft. For example, an inner diameter of the ring (e.g., inner ring diameter 54) may be smaller than a second diameter of the second region of the shaft (e.g., second diameter 58), such that the ring does not fit onto the second region of the shaft and is prevented from being longitudinally translated onto the second region of the shaft from the ring's position on the grooved region of the shaft. Similarly, the inner diameter of the ring may be smaller than a first diameter of the first region of the shaft (e.g., first diameter 56), such that the ring does not fit onto the first region of the shaft and is prevented from being longitudinally translated onto the first region of the shaft from the ring's position on the grooved region of the shaft.

Once the ring is positioned on the grooved region of the shaft at 204, a portion of the coupling feature may be inserted into the tie rod body at 206. Specifically, at least a portion of the shaft and the ring are inserted into the tie rod body at 206. The second region of the shaft and the ring may be sized relative to the tie rod body such that the second region of the shaft and the ring may be inserted into the tie rod body at 206 without engaging internal threads of the tie rod body (e.g., internal threaded portion 36). The ring thereby may be contained by the tie rod body such that the tie rod body serves to maintain the ring's position on the grooved region of the shaft. For example, in examples where the ring is a split ring that would fall off of the grooved region of the shaft if not held in place on the grooved region, the tie rod body may be configured to hold the split ring in place such that it does not fall off the shaft once the ring and shaft are positioned within the tie rod body. The tie rod assembly may be configured such that the ring prevents removal of the shaft from the bushing when the second region of the first shaft and the ring are positioned within the tie rod body. In some examples, the ring substantially prevents longitudinal translation of the shaft with respect to the bushing when the shaft and ring are positioned within the tie rod body. Engaging the bushing with the tie rod body at 208 generally includes engaging an external threaded portion of the bushing (e.g., external threaded portion 76) with the internal threaded portion of the tie rod body.

Methods 200 may include adjusting an overall length of the tie rod assembly (e.g., overall length 60) at 210. For example, adjusting the length of the tie rod assembly at 210 may include rotating the bushing with respect to the tie rod body. In some examples, the overall length may be adjusted at 210 by shortening the tie rod assembly by rotating the bushing in a first direction with respect to the tie rod body (e.g., clockwise). Additionally or alternatively, the overall length may be adjusted at 210 by lengthening the tie rod assembly by rotating the bushing in a second direction with respect to the tie rod body (e.g., counterclockwise). In some examples, the overall length may be adjusted at 210 by shortening the tie rod assembly by rotating the bushing in a counterclockwise direction with respect to the tie rod body, and the overall length may be adjusted at 210 by lengthening the tie rod assembly by rotating the bushing in a clockwise direction with respect to the tie rod body.

Additionally or alternatively, methods 200 may include locking the bushing with respect to the tie rod body at 212 to prevent rotation of the bushing with respect to the tie rod body, thereby preventing adjustment of the overall length of the tie rod body. The position of the bushing may be locked with respect to the tie rod body at 212 after engaging the bushing with the tie rod body at 208 and/or after adjusting the length of the tie rod assembly at 210. Locking the position of the bushing at 212 generally comprises selectively and reversibly locking the position of the bushing such that the overall length of the tie rod assembly may be adjusted before the bushing position is locked at 212, and may be further adjusted again after selectively unlocking the position of the bushing at 214.

Locking the position of the bushing at 212 generally includes engaging a locking mechanism, (e.g., locking mechanism 84) that is configured to prevent rotation and/or longitudinal translation of the bushing with respect to the tie rod body. In one example, locking the bushing at 212 includes installing a lock wire (e.g., lock wire 86) configured to prevent rotation of the bushing with respect to the tie rod body. Additionally or alternatively, locking the bushing at 212 may include installing a jam nut (e.g., jam nut 88 and/or jam nut 116) configured to prevent rotation of the bushing with respect to the tie rod body. In other methods, other known locking mechanisms may be used to lock the positon of the bushing with respect to the tie rod body at 212.

Illustrative, non-exclusive examples of inventive subject matter according to the present disclosure are described in the following enumerated paragraphs:

A1. A tie rod assembly, comprising:

a tie rod body extending longitudinally along a longitudinal axis of the tie rod assembly from a first end region to a second end region, wherein the tie rod body comprises a first internal threaded portion within the first end region;

a first coupling feature comprising a first coupling end and a first shaft that extends longitudinally from the first coupling end, wherein the first coupling feature is engaged with the tie rod body such that at least a portion of the first shaft is positioned within the first end region of the tie rod body;

a ring positioned on a grooved region of the first shaft, wherein an inner diameter of the ring is smaller than a first diameter of a first region of the first shaft, wherein the inner diameter of the ring is smaller than a second diameter of a second region of the first shaft, and wherein the grooved region of the first shaft is positioned between the first region and the second region; and a bushing rotatably coupled to the first region of the first shaft such that the first shaft is free to rotate within the bushing, about the longitudinal axis, wherein the bushing comprises an external threaded portion that is configured to engage the first internal threaded portion of the tie rod body, thereby coupling the first coupling feature to the tie rod body, and wherein the tie rod assembly is configured such that the ring prevents removal of the first shaft from the bushing when the second region of the first shaft and the ring are positioned within the tie rod body.

A1.1. The tie rod assembly of paragraph A1, wherein the ring comprises a split ring having a first cylindrical shell half and a second cylindrical shell half.

A1.2. The tie rod assembly of paragraph A1 or A1.1, wherein the ring substantially prevents longitudinal translation of the first shaft with respect to the bushing when the first shaft and the ring are positioned within the tie rod body.

A2. The tie rod assembly of any of paragraphs A1-A1.2, wherein an external diameter of the ring is large enough to substantially prevent longitudinal translation of the bushing with respect to the first shaft.

A3. The tie rod assembly of any of paragraphs A1-A2, wherein an/the external diameter of the ring is less than an inner thread diameter of the first internal threaded portion, such that the ring may be passed through the first internal threaded portion of the tie rod body without engaging the first internal threaded portion.

A4. The tie rod assembly of any of paragraphs A1-A3, wherein the first diameter of the first region is less than an inner bushing diameter of a bore of the bushing, such that the first region of the first shaft may be passed into the bore of the bushing.

A5. The tie rod assembly of any of paragraphs A1-A4, wherein the second diameter of the second region is less than an/the inner bushing diameter of a/the bore of the bushing such that the second region of the first shaft may be passed through the bore of the bushing.

A6. The tie rod assembly of any of paragraphs A1-A5, wherein the bushing is configured to be longitudinally slid onto the first shaft, over the second region and the first region, until at least some of the first region of the first shaft is positioned within the bushing.

A7. The tie rod assembly of any of paragraphs A1-A6, wherein the second region of the first shaft is positioned outside of the bushing when the bushing is positioned on the first shaft.

A8. The tie rod assembly of any of paragraphs A1-A7, wherein the first coupling end of the first coupling feature is positioned outside of the bushing when the bushing is positioned on the first shaft.

A9. The tie rod assembly of any of paragraphs A1-A8, wherein the second diameter of the second region is less than an/the inner thread diameter of the first internal threaded portion such that the second region may be passed through the first internal threaded portion of the tie rod body without engaging the first internal threaded portion.

A10. The tie rod assembly of any of paragraphs A1-A9, wherein the ring has a ring length that is defined along the longitudinal axis when the ring is positioned on the first shaft, wherein the grooved region has a grooved region length defined along the longitudinal axis, and wherein the ring length is substantially equal to the grooved region length.

A11. The tie rod assembly of any of paragraphs A1-A10, wherein the ring is sized relative to the grooved region such that the ring covers a majority of a surface area of the grooved region.

A12. The tie rod assembly of any of paragraphs A1-A11, wherein the ring is sized relative to the grooved region such that the ring substantially covers the grooved region.

A13. The tie rod assembly of any of paragraphs A1-A12, wherein the tie rod assembly is configured such that rotation of the bushing with respect to the tie rod body changes an overall length of the tie rod assembly, thereby allowing for selective adjustment of the overall length of the tie rod assembly.

A14. The tie rod assembly of any of paragraphs A1-A13, wherein the first diameter of the first region of the first shaft is at least substantially equal to the second diameter of the second region of the first shaft.

A15. The tie rod assembly of any of paragraphs A1-A14, wherein a grooved region diameter of the grooved region of the first shaft is less than the first diameter of the first region of the first shaft.

A16. The tie rod assembly of any of paragraphs A1-A15, wherein a/the grooved region diameter of the grooved region of the first shaft is less than the second diameter of the second region of the first shaft.

A17. The tie rod assembly of any of paragraphs A1-A16, wherein the inner diameter of the ring is substantially equal to a/the grooved region diameter of the grooved region.

A18. The tie rod assembly of any of paragraphs A1-A17, wherein the grooved region is positioned within the tie rod body when the tie rod assembly is assembled.

A19. The tie rod assembly of any of paragraphs A1-A18, wherein the second region is positioned within the tie rod body when the tie rod assembly is assembled.

A20. The tie rod assembly of any of paragraphs A1-A19, wherein the tie rod assembly is configured such that engagement between the second region of the first shaft and the ring retains the first coupling feature within the tie rod body.

A21. The tie rod assembly of any of paragraphs A1-A20, wherein the tie rod body is configured to contain the ring.

A21.1. The tie rod assembly of any of paragraphs A1-A20, wherein the tie rod body is configured to prevent a/the first cylindrical shell half of the ring and a/the second cylindrical shell half of the ring from separating from the grooved region of the first shaft.

A22. The tie rod assembly of any of paragraphs A1-A21.1, wherein the bushing and the second region each contacts the ring, such that the ring is longitudinally compressed between the bushing and the second region of the first shaft.

A23. The tie rod assembly of any of paragraphs A1-A22, wherein the tie rod assembly is configured to be used in a plurality of different locations and/or orientations within a structure.

A24. The tie rod assembly of any of paragraphs A1-A23, wherein the bushing comprises a hex head that is positioned outside the tie rod body, wherein rotation of the hex head about the longitudinal axis causes rotation of the bushing with respect to the tie rod body, thereby changing an/the overall length of the tie rod assembly, thereby allowing for selective adjustment of the overall length of the tie rod assembly.

A25. The tie rod assembly of any of paragraphs A1-A24, wherein the bushing comprises a pin wrench fitting that is positioned outside the tie rod body, wherein rotation of the pin wrench fitting about the longitudinal axis causes rotation of the bushing with respect to the tie rod body, thereby changing an/the overall length of the tie rod assembly, thereby allowing for selective adjustment of the overall length of the tie rod assembly.

A26. The tie rod assembly of any of paragraphs A1-A25, wherein the bushing is a monolithic body.

A26.1. The tie rod assembly of any of paragraphs A1-A26, wherein the first coupling feature is a monolithic body.

A26.2. The tie rod assembly of any of paragraphs A1-A26, wherein the second region of the first shaft is removably coupled to the first shaft.

A27. The tie rod assembly of any of paragraphs A1-A26.2, further comprising a locking mechanism, wherein the locking mechanism, when engaged, is configured to prevent changes to an/the overall length of the tie rod assembly.

A28. The tie rod assembly of paragraph A27, wherein the locking mechanism comprises a lock wire configured to prevent longitudinal movement of the bushing with respect to the tie rod body, thereby preventing adjustment of an/the overall length of the tie rod assembly until the lock wire is selectively unlocked.

A29. The tie rod assembly of paragraph A27 or A28, wherein the locking mechanism comprises a jam nut configured to prevent longitudinal movement of the bushing with respect to the tie rod body, thereby preventing adjustment of an/the overall length of the tie rod assembly until the jam nut is selectively unlocked.

A29.1. The tie rod assembly of any of paragraphs A27-A29 wherein the locking mechanism comprises a locking ring configured to engage a notch formed in the tie rod body.

A30. The tie rod assembly of any of paragraphs A1-A29.1, further comprising a second coupling feature engaged with the second end region of the tie rod body.

A31. The tie rod assembly of paragraph A30, wherein the second coupling feature comprises a second coupling end and a second shaft that extends longitudinally from the second coupling end, wherein the second coupling feature is engaged with the tie rod body such that at least a portion of the second shaft is positioned within the tie rod body, and wherein the tie rod assembly further comprises:

a second ring positioned on a second grooved region of the second shaft, wherein a second inner diameter of the second ring is smaller than a third diameter of a third region of the second shaft, wherein the second inner diameter of the second ring is smaller than a fourth diameter of a fourth region of the second shaft, and wherein the second grooved region of the second shaft is positioned between the third region and the fourth region; and a second bushing rotatably coupled to the third region of the second shaft such that the second shaft is free to rotate within the second bushing, about the longitudinal axis, wherein the second bushing comprises a second external threaded portion that is configured to engage a second internal threaded portion of the tie rod body within the second end region, thereby coupling the second coupling feature to the tie rod body, and wherein the tie rod assembly is configured such that the second ring substantially prevents longitudinal translation of the second shaft with respect to the second bushing when the second shaft and the second ring are positioned within the tie rod body.

A31.1. The tie rod assembly of paragraph A31, wherein the second ring comprises a second split ring having a third cylindrical shell half and a fourth cylindrical shell half.

A31.2. The tie rod assembly of paragraph A31.1, wherein the tie rod body is configured to prevent the third cylindrical shell half and the fourth cylindrical shell half of the second split ring from separating from the second grooved region of the second shaft.

A32. The tie rod assembly of any of paragraphs A1-A31.2, wherein the tie rod assembly is configured to be adjusted in-place in a structural assembly.

A33. The tie rod assembly of any of paragraphs A1-A32, wherein the tie rod assembly is configured to be adjusted under load.

A34. The tie rod assembly of any of paragraphs A1-A33, wherein the tie rod assembly is adjustable between a minimum overall length configuration and a maximum overall length configuration, wherein, in the minimum overall length configuration, a first proportion of the bushing is positioned within the tie rod body, wherein, in the maximum overall length configuration, a second proportion of the bushing is positioned within the tie rod body, and wherein the first proportion is greater than the second proportion.

B1. A method of assembling a tie rod assembly, comprising:

sliding a bushing onto a first region of a shaft of a coupling feature to rotatably couple the bushing to the first region of the shaft such that the shaft is free to rotate within the bushing, about a longitudinal axis of the tie rod assembly;

positioning a ring on a grooved region of the shaft of the coupling feature, wherein an inner diameter of the ring is smaller than a first diameter of the first region of the shaft, wherein the inner diameter of the ring is smaller than a second diameter of a second region of the shaft, and wherein the grooved region of the shaft is positioned between the first region and the second region;

inserting the ring into a tie rod body while the ring is positioned on the shaft, such that at least a portion of the shaft is also positioned within the tie rod body; and engaging an external threaded portion of the bushing with an internal threaded portion of the tie rod body of the tie rod assembly, thereby coupling the coupling feature to the tie rod body to form the tie rod assembly, wherein the tie rod assembly is configured such that the ring prevents removal of the shaft from the bushing when the second region of the shaft and the ring are positioned within the tie rod body.

B1.1. The method of paragraph B1, wherein the tie rod assembly is configured such that the ring substantially prevents longitudinal translation of the shaft with respect to the bushing when the shaft and the ring are positioned within the tie rod body.

B2. The method of paragraph B1 or B1.1, further comprising adjusting an overall length of the tie rod assembly by rotating the bushing with respect to the tie rod body, wherein rotating the bushing in a first direction lengthens the tie rod assembly, and wherein rotating the bushing in a second direction opposite the first direction shortens the tie rod assembly.

B3. The method of any of paragraphs B1-B2, further comprising locking the bushing with respect to the tie rod body to prevent rotation of the bushing with respect to the tie rod body, thereby preventing adjustment of an/the overall length of the tie rod assembly.

B4. The method of paragraph B3, wherein the locking the bushing comprises installing a lock wire configured to prevent rotation of the bushing with respect to the tie rod body.

B5. The method of any of paragraphs B3-B4, wherein the locking the bushing comprises installing a jam nut configured to prevent rotation of the bushing with respect to the tie rod body.

B5.1. The method of any of paragraphs B3-B5, wherein the locking the bushing comprises engaging a tab of a locking ring with a notch formed in the tie rod body.

B6. The method of any of paragraphs B1-B5.1, wherein the ring comprises a split ring, wherein the split ring comprises a first cylindrical shell half and a second cylindrical shell half, and wherein the positioning the ring on the grooved region comprises positioning the first cylindrical shell half on the grooved region and positioning the second cylindrical shell half on the grooved region, such that the first cylindrical shell half is engaged with the second cylindrical shell half.

B7. The method of any of paragraphs B1-B6, wherein the tie rod assembly is the tie rod assembly of any of paragraphs A1-A34.

C1. An aircraft, comprising the tie rod assembly of any of paragraphs A1-A34.

D1. The use of the tie rod assembly of any of paragraphs A1-A34 to secure a load within a structural assembly of an aircraft.

D2. The use of the tie rod assembly of any of paragraphs A1-A34 to accommodate tolerance variations and stack-ups during assembly or installation of an aircraft.

D3. The use of the tie rod assembly of any of paragraphs A1-A34 in an aviation, automotive, mass transit, and/or static construction-related assembly, to tie one structural member to another.

D4. The use of the tie rod assembly of any of paragraphs A1-A34 in an aviation, automotive, mass transit, and/or static construction-related assembly, to transfer movement and forces across components.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. A tie rod assembly, comprising:
   a tie rod body extending longitudinally along a longitudinal axis of the tie rod assembly from a first end region to a second end region, wherein the tie rod body comprises a first internal threaded portion within the first end region;
   a first coupling feature comprising a first coupling end and a first shaft that extends longitudinally from the first coupling end, wherein the first coupling feature is engaged with the tie rod body such that at least a portion of the first shaft is positioned within the first end region of the tie rod body;
   a ring positioned on a grooved region of the first shaft, wherein an inner diameter of the ring is smaller than a first diameter of a first region of the first shaft, wherein the inner diameter of the ring is smaller than a second diameter of a second region of the first shaft, and wherein the grooved region of the first shaft is positioned between the first region and the second region; and
   a bushing rotatably coupled to the first region of the first shaft such that the first shaft is free to rotate within the bushing, about the longitudinal axis, wherein the bushing comprises an external threaded portion that is configured to engage the first internal threaded portion of the tie rod body, thereby coupling the first coupling feature to the tie rod body, and wherein the tie rod assembly is configured such that the ring prevents longitudinal translation of the bushing with respect to the first shaft and removal of the first shaft from the bushing when the second region of the first shaft and the ring are positioned within the tie rod body.

2. The tie rod assembly according to claim 1, wherein the ring comprises a split ring having a first cylindrical shell half and a second cylindrical shell half.

3. The tie rod assembly according to claim 2, wherein the tie rod body is configured to contain the split ring and prevent the first cylindrical shell half and the second cylindrical shell half from separating from the grooved region of the first shaft.

4. The tie rod assembly according to claim 1, wherein an external diameter of the ring is large enough to substantially prevent longitudinal translation of the bushing with respect to the first shaft.

5. The tie rod assembly according to claim 4, wherein the external diameter of the ring is less than an inner thread diameter of the first internal threaded portion, such that the ring is configured to be passed through the first internal threaded portion of the tie rod body without engaging the first internal threaded portion.

6. The tie rod assembly according to claim 1, wherein the first diameter of the first end region is less than an inner bushing diameter of a bore of the bushing, such that the first end region of the tie rod body may be passed into the bore of the bushing, and wherein the second diameter of the second region is less than the inner bushing diameter of the bore of the bushing, such that the second end region of the tie rod body may be passed through the bore of the bushing.

7. The tie rod assembly according to claim 1, wherein the second region of the first shaft is positioned outside of the bushing when the bushing is positioned on the first shaft.

8. The tie rod assembly according to claim 1, wherein the tie rod assembly is configured such that rotation of the bushing with respect to the tie rod body changes an overall length of the tie rod assembly, thereby allowing for selective adjustment of the overall length of the tie rod assembly.

9. The tie rod assembly according to claim 1, wherein a grooved region diameter of the grooved region of the first shaft is less than the first diameter of the first region of the first shaft, and less than the second diameter of the second region of the first shaft.

10. The tie rod assembly according to claim 1, wherein the grooved region is positioned within the tie rod body when the tie rod assembly is assembled, and further wherein the second region is positioned within the tie rod body when the tie rod assembly is assembled.

11. The tie rod assembly according to claim 1, wherein the tie rod assembly is configured such that engagement between the second region of the first shaft and the ring retains the first coupling feature within the tie rod body.

12. The tie rod assembly according to claim 1, wherein the bushing and the second region each contacts the ring, such that the ring is longitudinally compressed between the bushing and the second region of the first shaft.

13. The tie rod assembly according to claim 1, further comprising a locking mechanism, wherein the locking mechanism, when engaged, is configured to prevent changes to an overall length of the tie rod assembly.

14. The tie rod assembly according to claim 1, further comprising a second coupling feature engaged with the second end region of the tie rod body, wherein the second coupling feature comprises a second coupling end and a second shaft that extends longitudinally from the second coupling end, wherein the second coupling feature is engaged with the tie rod body such that at least a portion of the second shaft is positioned within the tie rod body, and wherein the tie rod assembly further comprises:
  a second ring positioned on a second grooved region of the second shaft, wherein a second inner diameter of the second ring is smaller than a third diameter of a third region of the second shaft, wherein the second inner diameter of the second ring is smaller than a fourth diameter of a fourth region of the second shaft, and wherein the second grooved region of the second shaft is positioned between the third region and the fourth region; and
  a second bushing rotatably coupled to the third region of the second shaft such that the second shaft is free to rotate within the second bushing, about the longitudinal axis, wherein the second bushing comprises a second external threaded portion that is configured to engage a second internal threaded portion of the tie rod body within the second end region, thereby coupling the second coupling feature to the tie rod body, and wherein the tie rod assembly is configured such that the second ring substantially prevents longitudinal translation of the second shaft with respect to the second bushing when the second shaft and the second ring are positioned within the tie rod body.

15. A method of assembling a tie rod assembly, comprising:
  sliding a bushing onto a first region of a shaft of a coupling feature to rotatably couple the bushing to the first region of the shaft such that the shaft is free to rotate within the bushing, about a longitudinal axis of the tie rod assembly;
  positioning a ring on a grooved region of the shaft of the coupling feature, wherein an inner diameter of the ring is smaller than a first diameter of the first region of the shaft, wherein the inner diameter of the ring is smaller than a second diameter of a second region of the shaft, and wherein the grooved region of the shaft is positioned between the first region and the second region;
  inserting the ring into a tie rod body while the ring is positioned on the shaft, such that at least a portion of the shaft is also positioned within the tie rod body; and
  engaging an external threaded portion of the bushing with an internal threaded portion of the tie rod body of the tie rod assembly, thereby coupling the coupling feature to the tie rod body to form the tie rod assembly, wherein the tie rod assembly is configured such that the ring prevents longitudinal translation of the bushing with respect to the first shaft and removal of the shaft from the bushing when the second region of the shaft and the ring are positioned within the tie rod body.

16. The method according to claim 15, wherein the ring comprises a split ring having a first cylindrical shell half and a second cylindrical shell half, and wherein the positioning the ring on the grooved region comprises positioning the first cylindrical shell half on the grooved region and positioning the second cylindrical shell half on the grooved region, such that the first cylindrical shell half is engaged with the second cylindrical shell half.

17. The method according to claim 15, further comprising adjusting an overall length of the tie rod assembly by rotating the bushing with respect to the tie rod body, wherein rotating the bushing in a first direction lengthens the tie rod assembly, and wherein rotating the bushing in a second direction opposite the first direction shortens the tie rod assembly.

18. The method according to claim 17, further comprising locking the bushing with respect to the tie rod body to prevent rotation of the bushing with respect to the tie rod body, thereby preventing adjustment of the overall length of the tie rod assembly.

19. The method according to claim 18, wherein the locking the bushing comprises installing a lock wire configured to prevent rotation of the bushing with respect to the tie rod body.

20. The method according to claim 18, wherein the locking the bushing comprises installing a jam nut configured to prevent rotation of the bushing with respect to the tie rod body.

* * * * *